United States Patent
Bloomer

[15] 3,694,632
[45] Sept. 26, 1972

[54] AUTOMATIC TEST EQUIPMENT UTILIZING A MATRIX OF DIGITAL DIFFERENTIAL ANALYZER INTEGRATORS TO GENERATE INTERROGATION SIGNALS

[72] Inventor: David John Bloomer, Wheathampstead, England

[73] Assignee: Haeker Siddeley Dynamics Limited, Hertfordshire, England

[22] Filed: Dec. 28, 1970

[21] Appl. No.: 101,685

[30] Foreign Application Priority Data

Dec. 31, 1969 Great Britain..........63,545/69

[52] U.S. Cl. ...235/150.53, 235/150.31, 235/151.31, 324/73 AT
[51] Int. Cl. ..........................G06j 1/02, G01r 15/12
[58] Field of Search....235/150.31, 152, 150.53, 197, 235/150.31, 151.3, 151.31, 153; 324/73 R, 73 AT, 76 R, 76 A; 340/146.1

[56] References Cited

UNITED STATES PATENTS

| | | | |
|---|---|---|---|
| 3,487,304 | 12/1969 | Kennedy | 324/73 R |
| 3,585,500 | 6/1971 | Grubel | 324/73 R X |
| 3,586,837 | 6/1971 | Hyatt et al. | 235/150.31 |
| 3,598,974 | 8/1971 | Lincoln | 235/150.31 |
| 3,601,591 | 8/1971 | Gaines et al. | 235/150.31 |

OTHER PUBLICATIONS

Silber " Function Generation with a DDA" Instruments And Control Systems" Vol. 33, No. 11, Nov. 1960 pgs. 1895– 1899

*Primary Examiner*—Joseph F. Ruggiero
*Attorney*—Dowell & Dowell

[57] ABSTRACT

In computer-controlled automatic test or check-out equipment, interrogation signals for application to a unit under test are generated by a matrix of digital differential analyzer integrators, the digital outputs of the matrix be applied to digital-to-analogue converters so as to produce analogue signals to be fed to the unit under test. The computer provides initial control signals to determine the connections within the matrix and to set in initial values in the registers of the integrators, after which the matrix is driven by its own clock pulse generator, leaving the computer free for processing the response signals from the unit under test.

2 Claims, 8 Drawing Figures

3,694,632

AUTOMATIC TEST EQUIPMENT UTILIZING A MATRIX OF DIGITAL DIFFERENTIAL ANALYZER INTEGRATORS TO GENERATE INTERROGATION SIGNALS

This invention relates to computer-controlled automatic test or check-out equipment.

Present day automatic test equipment (A.T.E.) employs a wide variety of programmable, special to type, interrogating stimulus and measurement devices. Non-standard interrogating waveforms are generated using special purpose signal sources, mechanical resolvers and servo units. It is an object of this invention to provide a means of synthesizing interrogating signals by the use of digital logic and computer-based sub-routines that will result in increased flexibility of operation and at the same time reduce costs by eliminating the wide variety of special purpose hardware required hitherto.

According to the present invention, a combination of two or more digital differential analyzer (D.D.A.) integrators is employed in automatic test equipment as a stimulus synthesizer producing signals for interrogating a unit under test. Integrator interconnections and initial conditions are set up by a control computer in response to a test program so as to generate the desired stimulus waveform.

One arrangement in accordance with the invention will now be described by way of example, and with reference to the accompanying drawings in which.

Figure 3:
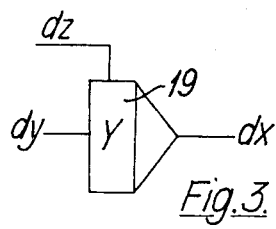
Figure 4:
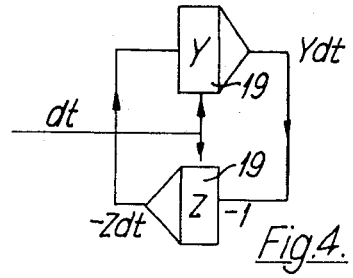
Figure 5:
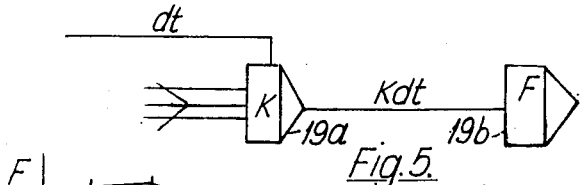
Figure 6:
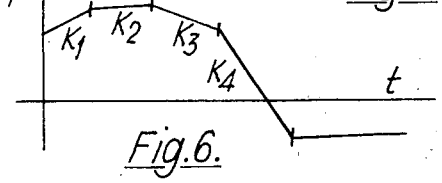
Figure 7:
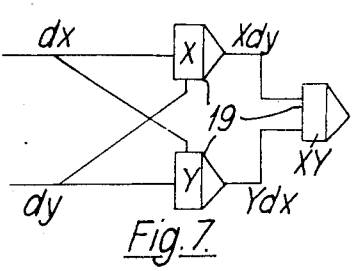
Figure 8:
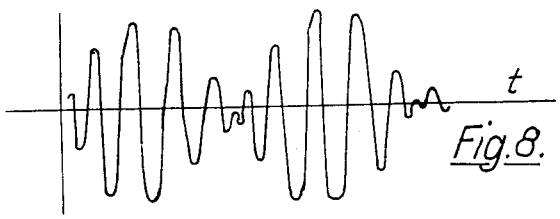

FIG. 3 is a simplified representation of one digital differential analyzer integrator, FIG. 4 illustrates the generation of a sine wave by means of two digital differential analyzer integrators, FIG. 5 illustrates the generation of a discontinuous non-linear waveform, FIG. 6 shows a waveform such as can be generated by the means of FIG. 5, FIG. 7 illustrates multiplication using three digital differential analyzer integrators, and FIG. 8 is a waveform to show modulation such as can be achieved by the means of FIG. 7.

STIMULUS SYNTHESIS

Figure 1:
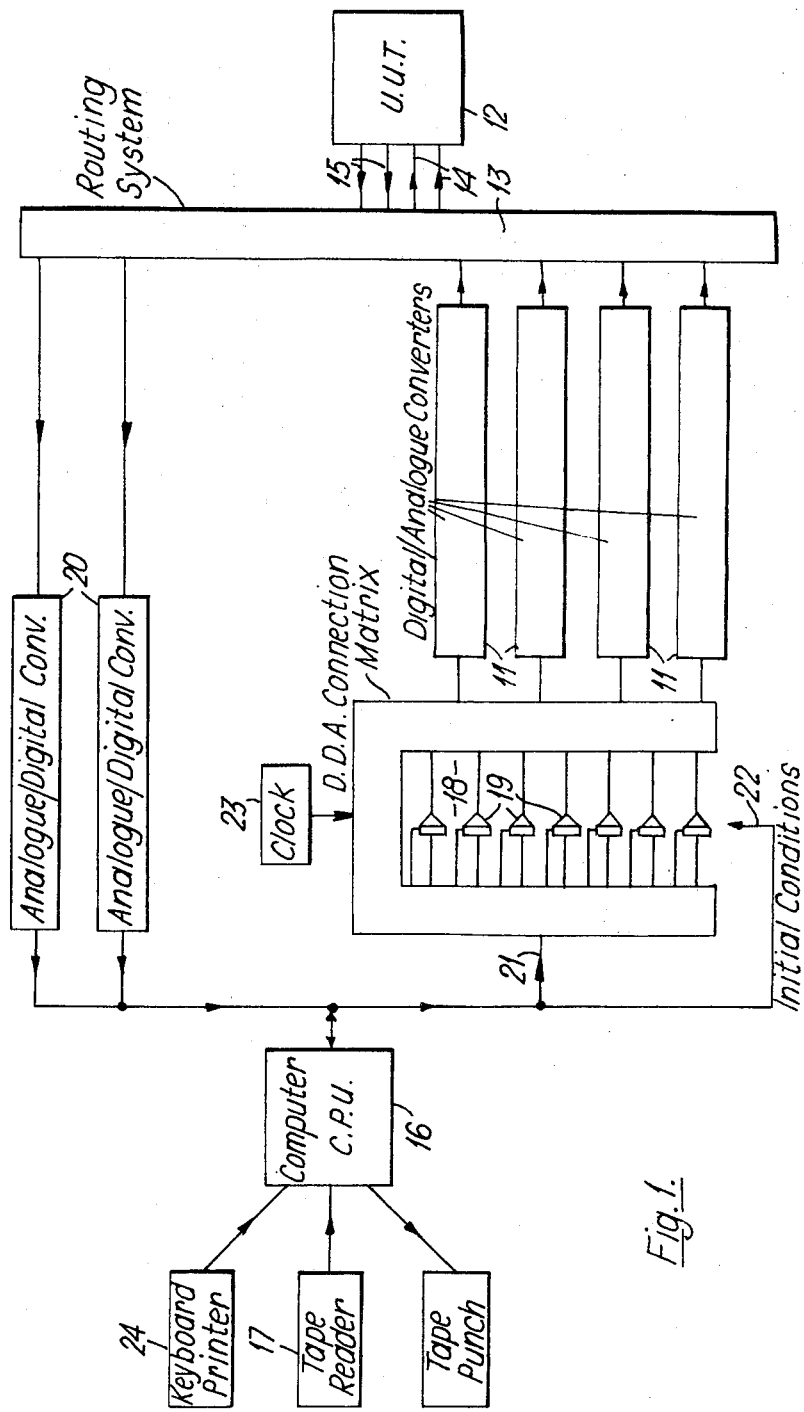
FIG. 1 is a block diagram of a system according to the invention.

Referring to FIG. 1, the unit under test (U.U.T.) 12 receives synthesized input signals via a routing system 13 from a set of digital-to-analogue converters 11. Typical signals required are D.C. voltages, simulated synchro angles and suppressed carrier waveforms. The digital system must be capable of controlling the input registers of the units under test so as to provide accurate fully synchronized voltages simultaneously to all U.U.T. inputs 14. Concurrently with the voltage synthesis the computer 16 controlling the testing may be required to sample and analyze the resulting U.U.T. outputs 15 fed to it via analogue-to-digital converters 20. It is therefore desirable to minimize the work to be performed by the computer during voltage synthesis as this will allow more comprehensive on-line analysis of the sampled U.U.T. outputs.

The input signals to be applied to the unit under test 12 via the converters 11 are synthesized by a digital differential analyzer matrix 18 having its own clock pulse generator 23. The digital differential analyzer techniques provide a method of generating a wide variety of waveforms in a manner requiring little or no computer intervention during actual synthesis. Waveform characteristics are determined by the interconnection of standard D.D.A. integrators 19 in the matrix 18. The computer program gives rise to signals from the computer on lines 21 and 22 determining the interconnection and initial conditions of the integrators 19 and initiating computation and synthesis. Thereafter the computer 16 is free to monitor and analyze the resulting signals 15 received from the unit under test via the converters 20. The digital techniques involved ensure precise repeatability and phase control of all generated waveforms. Problems of step approximation to time functions are minimized as the register of the digital-to-analogue converters 11 are updated incrementally according to the prescribed algebraic laws chosen.

PROGRAMMING

Test programs may be specified on a variety of input media: paper type, punched cards, magnetic tape, magnetic disc, or computer core store. The controlling computer 16 which transforms the test program into D.D.A. settings and A.T.E. functions may be a general purpose digital computer or special purpose logic. The digital waveforms generated by the D.D.A. unit may be converted into a variety of analogue forms. Specific examples are electrical current, voltage, hydraulic pressure and pneumatic pressure.

In FIG. 1 the controlling computer 16 has paper tape and teletype inputs 17, 24.

THE D.D.A. INTEGRATOR

The fundamental unit of the digital differential analyzer matrix 18 is the digital integrator. By suitably interconnecting two or more such integrators 19 a large variety of waveforms may be generated in a form suitable for controlling the digital-to-analogue converters 11. Sine waves, saw tooths and algebraic functions are generated to the full accuracy of the D.A.C. input register. Arbitrary functions are approximated by straight line or curved segments and require a minimum of external control.

An alternative method of function generation is to control a D.A.C. input register directly from a digital computer. The speed and accuracy of this method is determined by the rate at which the computer can update this register. The volume of tabular data and the rate at which it can be accessed usually dictate a course step approximation to the function that bears no relation to the potential D.A.C. accuracy.

In contrast the D.D.A. method generates algebraic functions to the full accuracy of the D.A.C. and no external control is required once the initial conditions have been set.

INTEGRATOR LOGIC

Figure 2:
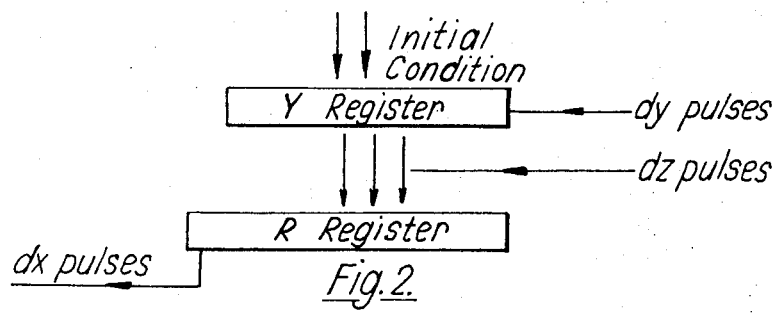
FIG. 2 illustrates the integrator logic of the digital differential analyzer.

Referring to the diagrammatic representation of a D.D.A. integrator in FIG. 2, the rates of change of analogue variables X, Y and Z are represented by pulse rates $dx$, $dy$, $dz$. The input $dy$ pulses are accumulated in the binary register Y. This register therefore contains the current value of the variable Y and may be used to control a D.A.C. The independent variable of integration (which need not be time) is represented by the pulse rate $dz$. On receipt of a $dz$ pulse the contents of the Y register are added to the R register. An overflow of the R register results in an output pulse $dx$. The unit thus acts as a pulse rate divider where $dx = Y\,dz$. If the output pulses $dx$ are accumulated in the input register of a second integrator we have the relationship $$X = \int Y dz.$$

The signal lines $dx$, $dy$ and $dz$ are in practice twin cables. Positive rates are represented by pulses along one wire and negative rates by pulses along the other wire.

The D.D.A. integrator 19 may conveniently be represented more simply as shown in FIG. 3, which is also the manner of representation in FIG. 1.

SINE WAVE GENERATION

Sine wave generation, by means of two of the D.D.A. integrators 19 appropriately connected, is illustrated in FIG. 4.

In response to a uniform pulse rate $dt$ from the clock 23 (FIG. 1) the contents of the Y and Z registers will vary according to the relationship $$Y = A \sin(t + \phi)$$

$$Z = A \cos(t = +)$$

The amplitude $A$ and phase $\phi$ are determined by the initial conditions of the Y and Z registers. The frequency is determined by the clock pulse rate $dt$. Other frequencies may be obtained by dividing the basic clock pulse rate using a further D.D.A. integrator.

DISCONTINUOUS FUNCTION GENERATION

Discontinuous non-linear function generation is illustrated in FIGS 5 and 6.

The input register of a first integrator 19a is set by external means (the digital computer 16). The initial condition of the function F(O) is set in a second integrator 19b. The rate of change of F in the second integrator is determined by the value of K in the first integrator 19a. Thus each segment of the function shown graphically in FIG. 6 is generated automatically. External control is only required to change the slope at each breakpoint. The contents of the input register of the second unit 19b are used to control a digital-to-analogue converter 11. Functions may be approximated by curved segments in a similar manner using further D.D.A. integrators 19.

MULTIPLICATION

Multiplication of varying quantities may be implemented with three standard D.D.A. integrator units 19, as in FIG. 7, using the relationship $d(XY) = Xdy + Ydx$. Modulated signal waveforms, such as that shown in FIG. 8, may thus be generated by multiplying a low frequency signal by a higher frequency carrier waveform.

What I claim is:

1. Computer-controlled automatic test equipment, comprising a digital computer for controlling the testing and also for analyzing returning signal responses resulting from the testing at least one peripheral input device supplying information to said computer, at least one peripheral output device receiving information from said computer, a plurality of analogue-to-digital converters, a routing system for routing analogue signals to a unit under test and also for routing analogue signal responses from the unit under test to said analogue-to-digital converters, a response input channel of said computer receiving for computer analysis the digital signal outputs of said analogue-to-digital converters, a plurality of digital differential analyzer integrators combined into a matrix with variable interconnections for synthesizing a variety of digital test signals, a control output channel of said computer delivering computer output signals to said matrix to determine said matrix interconnections and also to set the initial conditions in said integrators, and a plurality of digital-to-analogue converters receiving said synthesized digital test signals from said matrix and converting them into said analogue test signals which are delivered to said routing system.

2. Equipment according to claim 1, wherein a clock pulse generator is provided to drive the integrator matrix after the interconnections and initial conditions have been determined by the computer signals, thereby leaving the computer free to process response signals returning from the unit under test.

* * * * *

UNITED STATES PATENT OFFICE
CERTIFICATE OF CORRECTION

Patent No. 3,694,632   Dated September 26, 1972

Inventor(s) DAVID JOHN BLOOMER

It is certified that error appears in the above-identified patent and that said Letters Patent are hereby corrected as shown below:

In the heading of the patent, column 1, line 8, correct the spelling of the name of applicant's assignee to read HAWKER SIDDELEY DYNAMICS LIMITED.

Signed and sealed this 24th day of April 1973.

(SEAL)
Attest:

EDWARD M. FLETCHER, JR.
Attesting Officer

ROBERT GOTTSCHALK
Commissioner of Patents